Figure 1:
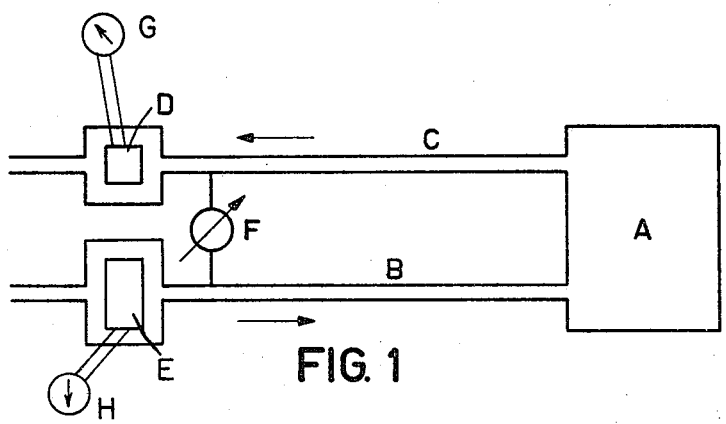

United States Patent Office 3,140,396
Patented July 7, 1964

3,140,396
NEUTRON DETECTOR FOR MEASURING THE NEUTRON FLUX IN A REACTOR
Jacob Hendrik Spaa and Kars van Duuren, Eindhoven, Netherlands, assignors to North American Philips Company, Inc., New York, N.Y., a corporation of Delaware
Filed Aug. 8, 1960, Ser. No. 48,136
Claims priority, application Netherlands Aug. 25, 1959
2 Claims. (Cl. 250—83.1)

This invention relates to neutron detectors, more particularly for measuring the flux of neutrons in nuclear reactors.

For measuring the flux of neutrons in nuclear reactors, use is commonly made of ionisation chambers and proportional counter tubes arranged inside the reactor. The circuit arrangement and the structure of such devices are comparatively complicated. An object of the invention is to provide a neutron detector which is of an extremely simple structure and can readily be installed and is, in addition, insensitive to gamma rays. Another object of the invention is to provide a device which permits of determining the period of a reactor.

A neutron detector according to the invention comprises a chamber having a supply conduit and a discharge conduit for a medium, homogeneous or not homogeneous, which can be activated by the neutrons, preferably a gas, the discharge conduit including a detector for measuring the radiation activity of the outflowing medium. The chamber is positioned in the reactor at the area where the flux of neutrons is to be measured and the supply and discharge conduits are led to the exterior. Consequently, the radiation detector may be arranged outside the reactor. Also arranged outside the reactor is the device for causing circulation of a gas through the chamber.

The temperature at the area of the chamber, which is also important for proper interpretation of the radiation activity measured, can be determined by manufacturing the supply and discharge conduits of different materials so that a thermo-electric voltage is produced at the chamber, which is measured outside the reactor and which is decisive for the temperature at the chamber.

When the gas circulates in a closed circuit, it is desirable to use a container in which the gas remains for so long a period that it can substantially lose its radio-activity. It is often necessary to arrange a radiation detector also in the supply conduit to the chamber in order to determine the activity of the inflowing gas. The difference between the radiation activities of the inflowing gas and the outflowing gas is determinative of the intensity of the flux of neutrons at the area of the chamber.

By a suitable choice of the pressure and the velocity of the gas, of the shape of the chamber A and the radiation detectors and of the volume of these detectors, it is possible for the sensitivity of the device to be matched to the intensity of the flux to be measured so that measurement over a wide range is possible.

Argon may be used as a gas having favourable properties for a device according to the invention.

It is furthermore possible to position in the discharge conduit a plurality of radiation detectors having equal or different sensitivities and placed at a distance from one another.

In order that the invention may be readily carried into effect, it will now be described in detail, by way of example, with reference to the accompanying diagrammatic drawing.

FIGURE 1 shows one embodiment of a device according to the invention having a chamber A the wall of which is, for example, of aluminium and which is provided with a supply conduit B and a discharge conduit C which may be of different materials, for example aluminium and an alloy of aluminium and magnesium respectively. A wider portion of the discharge conduit C contains a radiation detector D, for example a Geiger counter or a scintillation counter the output of which can be measured by an indicating instrument G. A device (not shown) is provided for leading a gas, for example argon, through the chamber A. The chamber is arranged at the area where the flux of neutrons is to be measured. Since the density of the gas is inversely proportional to the absolute temperature and the number of nuclei activated per unit-time and per unit-volume depends upon the density, it is important to know the temperature of the chamber in order to be able to make a correction in determining the flux of neutrons. For this purpose a voltmeter F is connected between the conduits B and C. The temperature of A can be determined from the thermo-electric voltage measured between the conduits B and C.

Let it be assumed that the chamber has a volume of 1000 cm.$^3$ and that 1000 cm.$^3$ of argon are passed through it per unit-time at atmospheric pressure. A proportion of argon ($A^{40}$) will be converted by the action of the neutrons into $A^{41}$. The amount of converted argon may approximately be determined as follows.

The active cross-section of argon atoms for thermal neutrons is $0.5 \times 10^{-24}$ cm.$^2$ and the half-value period of $A^{41}$ is 109 minutes. From this can be deduced for the magnitude $\lambda$ determining the rate of disintegration:

$$\lambda = 1.06 \times 10^{-4} \text{ sec.}^{-1}$$

When assuming that the flux of neutrons is $10^{12}$ neutrons per cm.$^2$/sec., the number of argon atoms activated per second is $$1000 \times 2.7 \times 10^4 \times 10^{12} \times 0.5 \times 10^{-24} = 1.35 \times 10^{10}$$

This applies to the normal temperature. In case of higher temperatures, the number of activated argon atoms is less at the same pressure.

Due to the activation, the radiation intensity per second is $1.35 \times 10^{10} \times 1.06 \times 10^{-4} = 1.43 \times 10^6$ disintegrations per second or 39 microcurie. This can be measured by means of the detector D. Since it is possible to measure activities which are in the order of $10^5$ to $10^6$ times less, it will be evident that the measuring device can readily be used with a flux of neutrons of about $10^7$ neutrons per cm.$^2$/sec. The sensitivity may be varied by using a different gas, a different pressure, a different rate of flow or a different geometry. Thus, information may also be obtained about the spectrum of the neutrons (high-speed or low-speed neutrons). The chamber is highly insensitive to gamma radiation.

A similar detector E, the output of which can be measured by indicating instrument H, may be arranged in the supply conduit for the gas, it thus being possible to measure the difference between the activities of the gas before and after the activation in the chamber.

Figure 2:
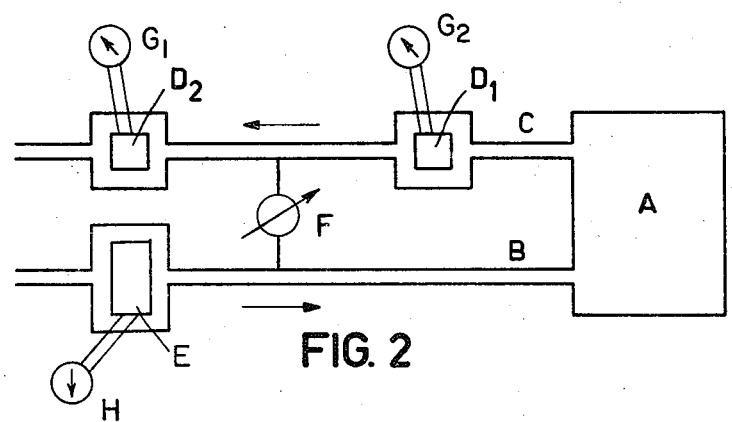

FIGURE 2 shows a device according to the invention which permits of determining the period T of a reactor. This period is defined as $$T = \left(\frac{d \ln \phi}{dt}\right)^{-1}$$

wherein $\phi$ represents the flux of neutrons. In starting up the reactor and also during its normal operation it is important to maintain the variation in the flux of neutrons and hence the period T sufficiently large, dependent upon the value of the flux.

To determine the period two radiation detectors D1 and D2 are arranged in the discharge conduit of the chamber A at a certain distance from each other and means are provided for comparing the indications of the detectors with each other. The variation in the flux of neutrons in A is thus found over periods of time $t-t'$ and $t-t'-\Delta t$, wherein $t'$ is the time which the gas, after leaving the chamber, needs to reach the detector D1 and $\Delta t$ is the transit time of the gas from D1 to D2. The period can be determined from the variation in flux thus measured by indicating devices $G_1$ and $G_2$.

In addition to the said two detectors, further detectors may be provided in order to vary the measuring range of the period.

What is claimed is:

1. A neutron detector comprising a chamber positioned in the path of a flux of neutrons, a supply conduit and a discharge conduit connected to said chamber for circulating through said chamber a medium which can be activated by neutrons, said conduits each being constituted of a material of different conductivity, a radiation detector in each of said supply and discharge conduits, means to compare the outputs of said radiation detectors to thereby measure the neutron flux, and means to measure a thermo-electric potential between said conduits to thereby determine the temperature in the proximity of said chamber.

2. A neutron detector comprising a chamber positioned in the path of a flux of neutrons, a supply conduit and a discharge conduit connected to said chamber for circulating through said chamber a medium which can be activated by neutrons, said conduits each being constituted of a material of different conductivity, a pair of spaced radiation detectors in said discharge conduit, a radiation detector in said supply conduit, means to compare the outputs of said radiation detectors in said discharge conduits, means to compare the output of one of said radiation detectors in said discharge conduit with the output of said radiation detector in said supply conduit to thereby measure the neutron flux, and means to measure a thermo-electric potential between said conduits to thereby determine the temperature in the proximity of said chamber.

References Cited in the file of this patent

UNITED STATES PATENTS

| | | |
|---|---|---|
| 2,741,592 | Borst et al. | Apr. 10, 1956 |
| 2,751,505 | Anderson | June 19, 1956 |